No. 749,051. PATENTED JAN. 5, 1904.
C. FREROT.
MACHINE FOR MAKING PAPER TUBES.
APPLICATION FILED JULY 29, 1893.
NO MODEL. 8 SHEETS—SHEET 2.

Fig. 2

WITNESSES:
C. Neveux
C. Sedgwick

INVENTOR
C. Frérot
BY
Munn & Co
ATTORNEYS.

No. 749,051. PATENTED JAN. 5, 1904.
C. FREROT.
MACHINE FOR MAKING PAPER TUBES.
APPLICATION FILED JULY 29, 1893.
NO MODEL. 8 SHEETS—SHEET 3.

WITNESSES:
C. Neveux
C. Sedgwick

INVENTOR
C. Frérot
BY
Munn & Co
ATTORNEYS.

No. 749,051. PATENTED JAN. 5, 1904.
C. FREROT.
MACHINE FOR MAKING PAPER TUBES.
APPLICATION FILED JULY 29, 1893.
NO MODEL. 8 SHEETS—SHEET 5.

WITNESSES:
C. Neveux
C. Sedgwick

INVENTOR
C. Frérot
BY Munn & Co
ATTORNEYS.

No. 749,051. PATENTED JAN. 5, 1904.
C. FREROT.
MACHINE FOR MAKING PAPER TUBES.
APPLICATION FILED JULY 29, 1893.
NO MODEL. 8 SHEETS—SHEET 6.

WITNESSES:
C. Neveux
C. Sedgwick

INVENTOR
C. Frerot
BY
Munn & Co
ATTORNEYS.

No. 749,051. Patented January 5, 1904.

UNITED STATES PATENT OFFICE.

CHARLES FREROT, OF REIMS, FRANCE, ASSIGNOR TO JOHN H. HAWORTH AND WALTER S. WATSON, OF LOWELL, MASSACHUSETTS.

MACHINE FOR MAKING PAPER TUBES.

SPECIFICATION forming part of Letters Patent No. 749,051, dated January 5, 1904.

Application filed July 29, 1893. Serial No. 481,832. (No model.)

*To all whom it may concern:*

Be it known that I, CHARLES FREROT, a citizen of France, residing in Reims, Department of Marne, France, have invented certain new and useful Improvements in Machines for Making Paper Tubes, of which the following is a full, clear, and exact description, and for parts of which I have obtained Letters Patent in France, No. 209,845, dated December 3, 1890.

The invention relates to machines for forming paper tubes such as are used in spinning-machines for winding up threads or in looms for paying out the thread through the shuttle and for other purposes.

The object of the invention is to provide a new and improved machine for rapidly and automatically forming paper tubes from a strip of paper unwinding from a roll.

The invention consists of certain parts and details and combinations of the same, as will hereinafter be described and then pointed out in the claims.

Reference is to be had to the accompanying drawings, forming a part of this specification, in which the same letters of reference indicate corresponding parts in all the figures.

In the tube-forming machine the paper strip A, preferably having beveled edges A' A', unwinds from a roller A², journaled on the forward leg B' and under the bed-plate B² of the main frame B, on which the machine is mounted. The strip of paper A is first passed forward through a wetting device C to moisten the edges A' for softening the fiber of the paper for the proper adhesion of the ink and paste or cement to be afterward applied. The paper is then passed to feed-rollers D, which cause the paper strip to continuously unwind from the roller A² and feed it forward to a compensating device E, from which the paper is intermittently drawn forward to two printing and embossing devices F for printing and embossing the paper strip at or near the beveled or outer edges thereof and on the under side with any desired mark or other matter. The wetting of the edges of the paper web as it enters on its passage through the machine before it has been printed, perforated, or cut allows the water to soak in and has the effect of rendering such edges soft and pliable, so that when subsequently pasted and pressed down in rolling up the tube complete adhesion at this terminal lap is secured, with no tendency to curl or separate at the finish-line. This permits the use of much harder-sized papers than would be possible in machines of the old type destitute of such preliminary wetting device.

Figure 2:
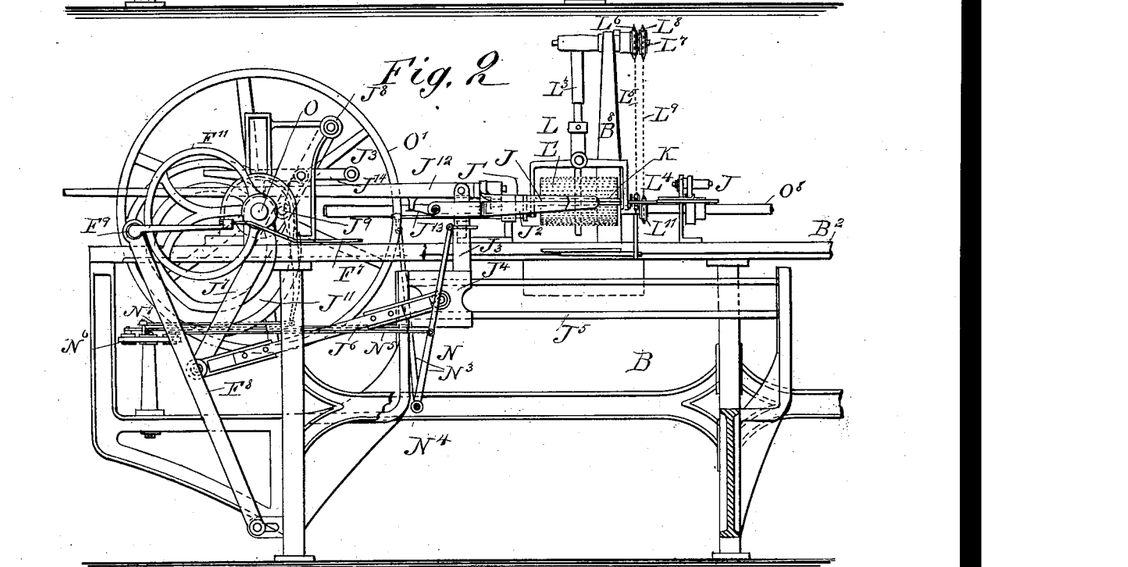
Fig. 2 is a side elevation of the same, the two parts of the machine being similarly displaced and a portion of the upper part of the figure being shown in vertical section.
Figure 8:
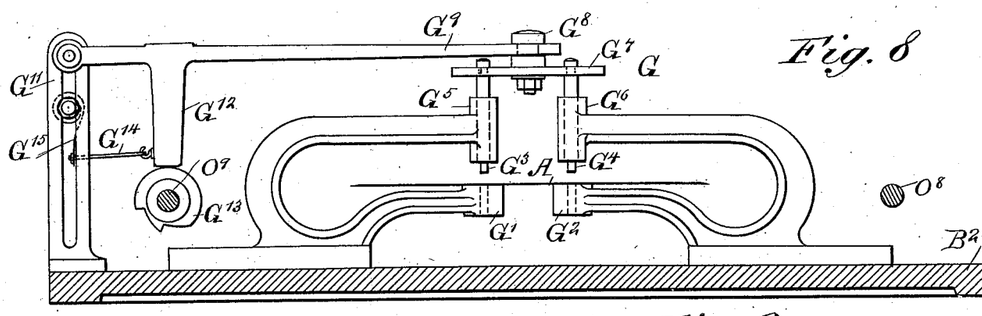
Fig. 8 is an enlarged transverse section of the perforating device on the line 8 8 of Fig. 1.
Figures 9, 10, 11, 12:
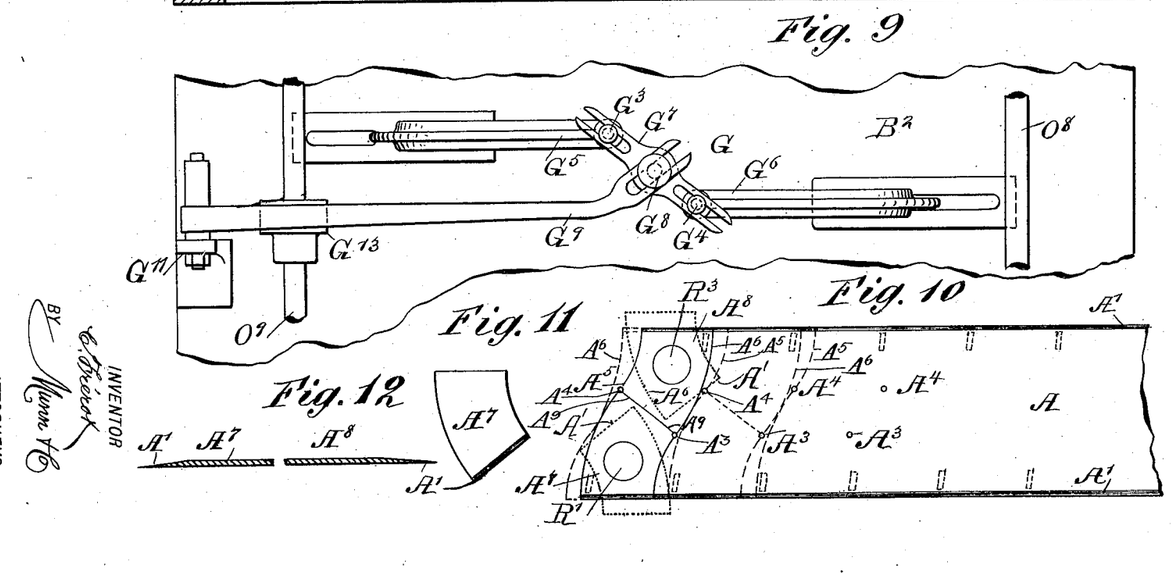
Fig. 9 is a plan view of the same.
Fig. 10 is a plan view of the paper strip, showing the print-marks, perforations, and cutting-lines.
Fig. 11 is a plan view of the cut-off piece of paper for forming a tube.
Fig. 12 is an enlarged transverse section of the paper pieces for forming the tubes.

The feed-rollers D, the compensating device E, and the paper printing and embossing devices F are arranged on top of the bed-plate $B^2$, as will be readily understood by reference to Fig. 2 of the drawings. The paper is then acted on by a perforating device G, (best shown in Figs. 8 and 9,) located in front of the printing and embossing device and serving to form apertures in the paper in an oblique line, as shown in Fig. 10 and for the purpose hereinafter more fully described. The paper strip then passes between the intermittent-feed rollers H to the cutting mechanism I for cutting the paper into two pieces, each of which is turned horizontally to bring it into proper position for a gripping and delivery device J, which delivers the respective pieces of paper to a tube-winding spindle K, on which the paper is wound into a tube, its surface being supplied with glue or paste from a paste-supplying device L, so that the successive layers are united into a finished tube. The surplus paste is wiped off, and then each tube is pushed off its winding-spindle by the tube-removing device N.

The several devices above enumerated act in unison and are all actuated from a main driving-shaft O, journaled on top of the bed-plate $B^2$ at the rear end thereof. On one end of the main driving-shaft O are mounted the fast and loose pulleys $O'$, the belt of which is adapted to be shifted from one to the other by a suitable belt-shifter $O^2$, shown in Fig. 1 and extending across the frame to be under the control of the operator standing on either side of the machine. On the front end of the shaft O is secured a fly-wheel $O^3$, Fig. 1, and on the said shaft, above the bed-plate $B^2$, are secured the bevel gear-wheels $O^4$ and $O^5$, in mesh with bevel gear-wheels $O^6$ and $O^7$, respectively secured on the rear ends of longitudinally-extending shafts $O^8$ and $O^9$, journaled in suitable bearings on top of the bed-plate $B^2$ near the edges thereof. The shafts $O^8$ and $O^9$ extend throughout the length of the bed-plate, as plainly shown in Fig. 1, the said shafts serving to actuate the several devices in the manner hereinafter more fully described.

The several devices above enumerated will be described in detail in the order as above given.

Figures 3, 4, 5:
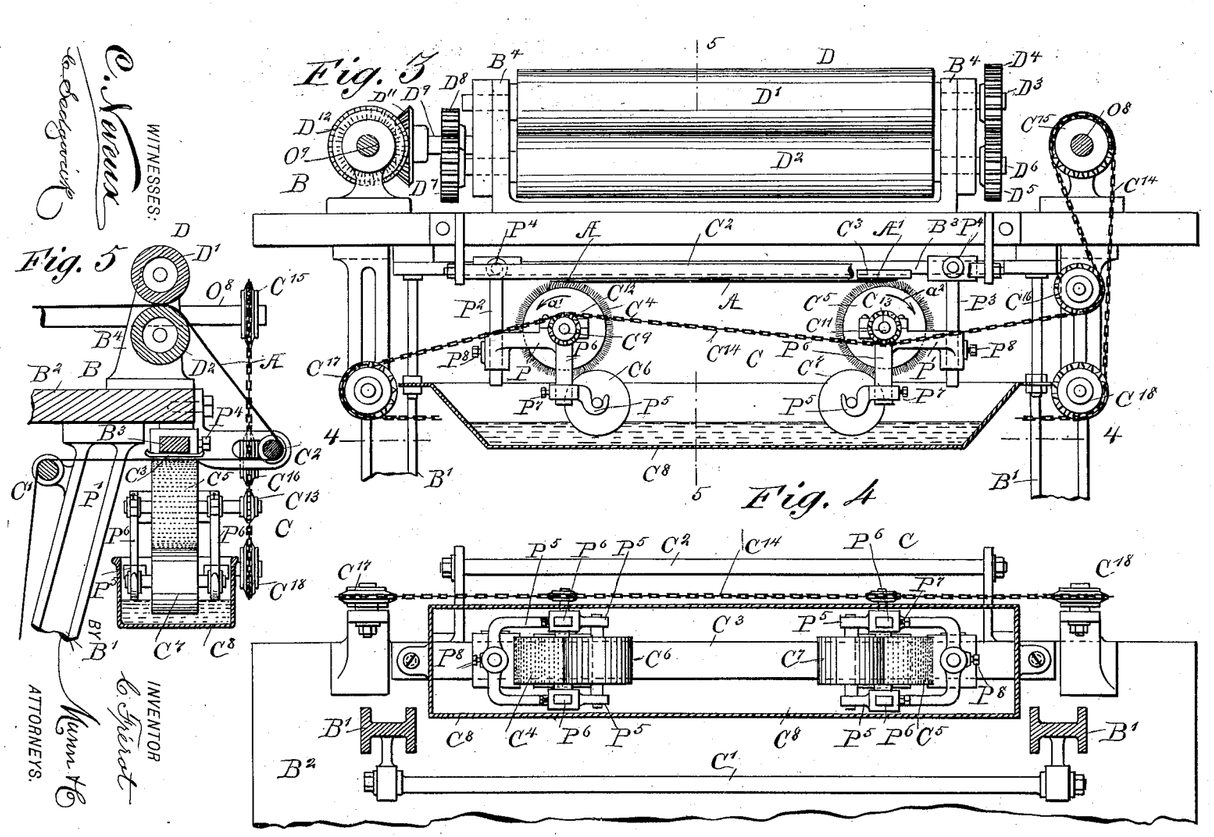
Fig. 3 is an enlarged end view of the wetting device with the trough in section.
Fig. 4 is an inverted sectional plan view of the same on the line 4 4 of Fig. 3.
Fig. 5 is a sectional side elevation of the same on the line 5 5 of Fig. 3.

The paper strip A after leaving the roll $A^2$ extends upward and passes over a transversely-extending rod $C'$ to a like rod $C^2$, so that the paper strip extends horizontally between the said two rods, as plainly shown in Figs. 2 and 5. About midway between the rods $C'$ and $C^2$ the paper strip passes under a guard $C^3$, secured on the under side of a transversely-extending bar $B^3$, forming part of the main frame B. The sides of this guard are slightly bent upward, as will be readily seen by reference to Fig. 5, and the paper strip is pressed against the under side of this guard by brushes $C^4$ and $C^5$ engaging the beveled edges $A'$ of the strip of paper A, as shown in Figs. 3 and 4. The brushes $C^4$ and $C^5$ rotate in the direction of the arrows $a'$ and $a^2$, respectively, Fig. 3, and are in contact with the peripheral surfaces of the rollers $C^6$ and $C^7$, extending into water contained in a trough $C^8$, supported on suitable brackets from the main frame B. The shafts $C^9$ and $C^{11}$ of the cylindrical brushes $C^4$ and $C^5$ are journaled in frames P and $P'$, held vertically adjustable on bars $P^2$ and $P^3$, fitted to slide transversely on the bar $B^3$, previously mentioned. Set-screws $P^4$ serve to hold the bars $P^2$ and $P^3$ in place on the bar $B^3$ after the brushes are properly adjusted, so as to engage with their upper surfaces the beveled edges $A'$ of the paper A. It will be understood that this transverse adjustment of the brushes $C^4$ and $C^5$ is necessary for wider or narrower paper A.

The rollers $C^6$ and $C^7$, Figs. 3 and 4, are each journaled in a frame $P^5$, held vertically adjustable on arms $P^6$, projecting from the frames P and $P'$, and each frame $P^5$ is adapted to be secured in place on its respective arms $P^6$ by a set-screw $P^7$. A like screw $P^8$ serves to hold the frame P or $P'$ in the proper position on the bars $P^3$, above mentioned. By mounting the rollers $C^6$ and $C^7$ in vertically-adjustable bearings the said rollers can be moved with more or less frictional contact on the bristles of the brushes $C^4$ and $C^5$, so as to supply the latter with more or less water taken up in the trough $C^8$. The shafts $C^9$ and $C^{11}$ of the brushes $C^4$ and $C^5$ carry sprocket-pinions $C^{12}$ and $C^{13}$, engaged by an endless sprocket-chain $C^{14}$, which derives its traveling motion from a sprocket-wheel $C^{15}$, secured on the forward end of the longitudinally-extending shaft $O^8$, above mentioned, and driven from the main driving-shaft O.

The endless sprocket-chain $C^{14}$, Fig. 3, extends from the sprocket-wheel $C^{15}$ to an idler $C^{16}$ and then passes under the sprocket-pinion $C^{13}$ and then over the sprocket-pinion $C^{12}$, to then pass around a sprocket-wheel $C^{17}$, journaled on a stud held on the front side of the main frame B. The sprocket-chain then extends again across the front of the trough $C^8$ to pass under a sprocket-wheel $C^{18}$ and then up to the sprocket-wheel $C^{15}$, held on the shaft $O^8$. Now when the latter is rotated a traveling motion is given to the sprocket-chain $C^{14}$, so that the sprocket-pinions $C^{12}$ and $C^{13}$ are rotated in the direction of the arrows $a'$ and $a^2$, respectively, to revolve the brushes $C^4$ and $C^5$ in opposite directions to moisten the edges $A'$ of the paper, so as to soften the fiber of the paper for the paste to readily adhere to it. The paper extends from the rod $C^2$ upward and forward and passes between the rollers $D'$ and $D^2$ of the continuous-feeding device D, the said rollers being journaled in suitable brackets $B^4$, secured on the front end of the bed-plate $B^2$.

The shaft $D^3$ of the upper roller $D'$ carries at one end a gear-wheel $D^4$, in mesh with a like gear-wheel $D^5$, secured on the shaft $D^6$ of the other roller, $D^2$, as plainly shown in Fig. 3. The other end of the shaft $D^6$ of the said roller $D^2$ carries a gear-wheel $D^7$, in mesh with a gear-wheel $D^8$, secured on a short transversely-extending shaft $D^9$, journaled in a bracket extending from the bearing $B^4$, as will be readily seen by reference to Figs. 1 and 3. The shaft $D^9$ carries a bevel gear-wheel $D^{11}$, in mesh with a bevel gear-wheel $D^{12}$, secured on the longitudinally-extending shaft $O^9$, so that when the latter is rotated a rotary motion is given by the said bevel gear-wheels $D^{12}$ and $D^{11}$ to the shaft $D^9$, which transmits its rotary motion by the gear-wheels $D^8$ and $D^7$ to the shaft $D^6$ of the roller $D^2$, so that the latter is rotated and by the gear-wheels $D^5$ and $D^4$ rotates the other roller, $D'$. The paper passing between the said rollers, which rotate continually, is fed forward to the paper-compensating device E, arranged in front of the feeding-rollers $D'$ and $D^2$.

Figure 7:
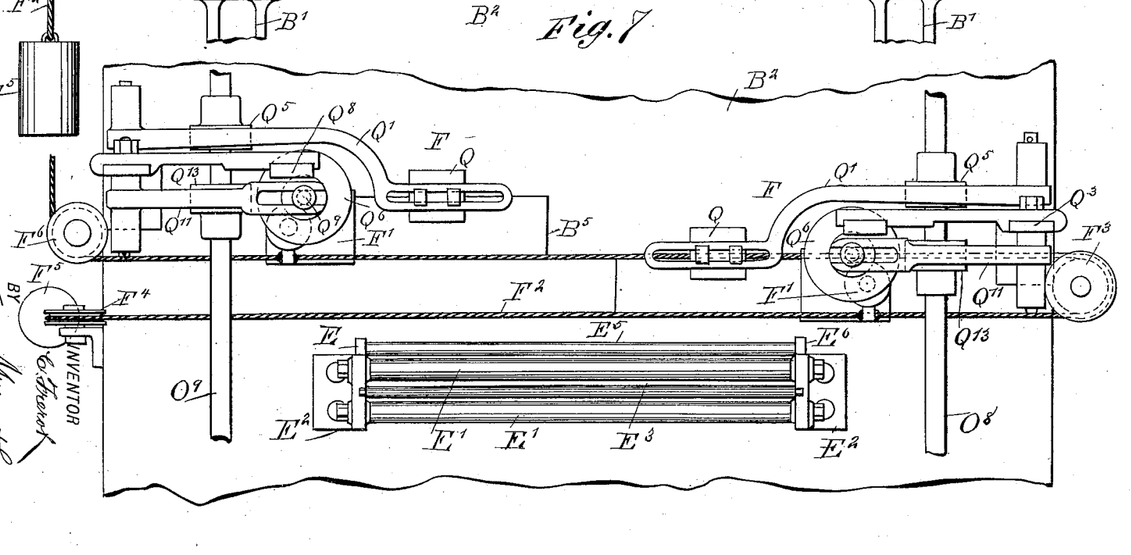
Fig. 7 is a plan view of the same, also showing the paper-compensating device.

The compensating device E (see Figs. 1, 2, and 7) is provided with a transversely-extending rod $E'$, secured in the upper ends of standards $E^2$, secured to the top of the bed-plate $B^2$. The inner sides of the standards are formed with vertical grooves in which is fitted to slide vertically a rod $E^3$, supported on top of the paper strip A, extending over the rod $E'$, under the said rod $E^3$, and up over another rod, $E^4$, also secured in the standards $E^2$ opposite the rod $E'$. The paper extends from the rod $E^4$ downward and under a rod $E^5$, mounted to slide loosely in longitudinal slots $E^6$, formed in the forward sides of the standards $E^2$. Now it will be seen that when the paper is continually fed forward by the feed-rollers $D'$ and $D^2$ and the paper is not taken up in front of the rod $E^5$ as fast as fed by the said rollers the rod $E^3$ will take up the surplus paper by sliding downward in its grooves in the standards $E^2$, and when the paper is again fed forward in front of the rod $E^5$ then the rod $E^3$ slides upward to be rotated to take up the next surplus amount of paper fed forward by the feeding device D. The forward feeding of the paper from the rod $E^5$ is accomplished by the intermittent-feeding device H, and this intermittent feeding is necessary to enable the printing and embossing devices, as well as the perforating device G, to act on the paper during the time the latter is at a standstill between the intermittent-feeding device H and the rod $E^5$ of the compensating device E.

The paper after leaving the compensating device E is printed or embossed by a printing and embossing device F, one for each side being shown. As both devices are alike in construction, it suffices to describe one.

Figure 6:
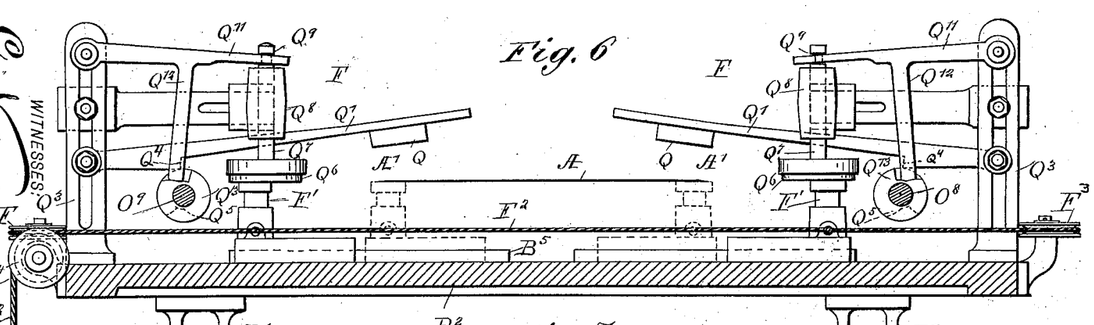
Fig. 6 is an enlarged transverse section of the printing and embossing device on the line 6 6 of Fig. 1.

Each printing and embossing device is provided with a type-block $F'$, carrying at its upper end type characters representing the mark or other matter to be printed or embossed on the under side of the paper A. The base of this type-block $F'$ is mounted to slide transversely on a bearing $B^5$, secured to the top of the bed-plate $B^2$, as plainly shown in Figs. 6 and 7. Each type-block $F'$ is secured on the strand of a rope $F^2$, extending transversely across the bed-plate $B^2$, the rear end of the said rope passing around a pulley $F^3$, while the front end of one strand of the rope passes over a pulley $F^4$ and then hangs downward, the lower end supporting a weight $F^5$. The other strand of the rope $F^2$ passes over a horizontally-disposed pulley $F^6$, journaled on the front side of the bed-plate, and then this end of the rope extends longitudinally and rearwardly to connect with a rod $F^7$, fitted to slide in suitable bearings on the front side of the bed-plate $B^2$, as plainly shown in Fig. 1. The outer end of the rod $F^7$ is pivotally connected with a lever $F^8$, fulcrumed at the rear leg $B'$ of the main frame B, (see Fig. 2,) and on the free end of the said lever $F^8$ is held a friction-roller $F^9$, traveling on the peripheral surface of a cam $F^{11}$, Fig. 2, secured on the shaft O, so that when the latter is rotated a swinging motion is given to the lever $F^8$, whereby the rod $F^7$ is caused to slide forward and backward, and a traveling motion is thus given to the rope $F^2$, which causes the type-blocks $F'$ to slide toward or from each other on their bearings $B^5$. It is understood that the weight $F^5$ causes an inward sliding of the type-blocks $F'$ and at the same time holds the friction-roller $F^9$ in contact with the cam $F^{11}$, which latter causes an outward sliding of the said type-blocks $F'$. It is understood that the two type-blocks $F'$ of the two printing and embossing devices F are attached to opposite strands of the rope $F^2$, so that when the latter is caused to travel the two type-blocks slide toward and from each other by the action of the weight $F^5$ and the cam $F^{11}$. When the type-blocks $F'$ are in their innermost position, as shown in dotted lines in Fig. 6, the type of the said blocks is directly under the edges of the paper A, and when the impression-blocks Q are now moved downward onto the top of the paper an impression is taken on the under side of the paper A. The impression-block Q for each printing and embossing device F is held longitudinally adjustable on a lever $Q'$, having its fulcrum vertically adjustable in a slotted standard $Q^3$, secured to the top of the bed-plate $B^2$, near the sides thereof. On the under side of the lever $Q'$ between the fulcrum and the impression-block Q is formed an offset or lug $Q^4$, resting on the peripheral surface of a cam $Q^5$, secured on the respective shaft $O^9$ or $O^8$. Now when the shafts $O^8$ and $O^9$ are rotated, as previously described, the cams $Q^5$ hold the impression-blocks Q in an uppermost position, as shown in Fig. 6, until the type-blocks $F'$ are under the paper and the latter is at a standstill for the time being. Then the lugs $Q^4$ are suddenly dropped by the cams $Q^5$, so that the levers $Q'$ swing downward and their impression-blocks Q strike the paper to make the impression. The types move forward and back and are beneath the impression-block at the proper time, being moved by a cam at the power end of the machine and by rod and cord around pulley. Ink is supplied to the type of each type-block $F'$ by an inking-pad $Q^6$, secured on the lower end of a shaft $Q^7$, mounted to slide vertically in suitable bearings formed in a bracket $Q^8$, held vertically adjustable on the slotted standard $Q^3$. The upper end of the shaft $Q^7$ is formed with an annular recess $Q^9$, engaged by the fork end of a lever $Q^{11}$, fulcrumed in the upper end of the slotted standard $Q^3$. On the lever $Q^{11}$ is formed a downwardly-extending arm $Q^{12}$, resting on the peripheral surface of the cam $Q^{13}$, fastened on the respective shaft $O^9$ or $O^8$. (See Figs. 6 and 7.) The cam $Q^{13}$ is arranged in such a manner that the pad $Q^6$ is held off the type of the type-block $F'$ during the time the latter is moving transversely; but as soon as the type-block $F'$ has returned to its outermost position the cam $Q^{13}$ causes the arm $Q^{12}$ to drop suddenly, so that the lever $Q^{11}$ swings downward, and thereby moves the pad $Q^6$ downward into contact at its under side with the type on the type-block $F'$. Ink is thus delivered to the type on the type-block, and then the pad $Q^6$ is again raised off the type-block by the action of the cam $Q^{13}$ on the arm $Q^{12}$ of the lever $Q^{11}$, engaging the shaft $Q^7$, carrying the said pad $Q^6$. The pad $Q^6$ is turned from time to time, so as to present new inking-surfaces to the type on the type-block. It will be seen that by the downward swinging of the levers $Q'$, carrying the impression-blocks Q, the paper is firmly pressed onto the type, so that a heavy impression is made. In case the pad $Q^6$ is dispensed with the impression is sufficient to show the type characters embossed in the paper.

The paper after leaving the printing and embossing devices F passes over a transversely-extending fixed bar $B^6$, supported from the bed-plate $B^2$ and serving to hold the paper in the proper position between the printing and embossing devices and the perforating device G. The latter (see Figs. 8 and 9) is provided with two female dies $G'$ and $G^2$, formed on suitable brackets secured to the bed-plate $B^2$, the said dies being adapted to be engaged by punches $G^3$ and $G^4$, mounted to slide vertically above the dies $G'$ and $G^2$ in suitable guideways $G^5$ and $G^6$, respectively, also held on the brackets carrying the dies $G'$ and $G^2$, as will be readily understood by reference to Fig. 8. The upper ends of the punches $G^3$ and $G^4$ are engaged by the slotted ends of a plate $G^7$, carrying a pin $G^8$, engaged by the forked end of a lever $G^9$, fulcrumed in a slotted bracket $G^{11}$, secured to the front side of the bed-plate $B^2$. An arm $G^{12}$ extends from the lower side of the lever $G^9$ and rests on the peripheral surface of the cam $G^{13}$, secured on the shaft $O^9$. A link $G^{14}$ is connected with the free end of the arm $G^{12}$ and connects with a spring $G^{15}$, held on the bracket $G^{11}$. When the shaft $O^9$ is rotated, the cam $G^{13}$ holds the punches $G^3$ and $G^4$ in an uppermost position during the time the paper A is fed forward by the intermittent feeding-rollers H. At the time the paper is at a standstill the cam $G^{13}$ permits the arm $G^{12}$ to drop downward, aided by the action of the spring $G^{15}$, so that the lever $G^9$ swings downward and causes the punches $G^3$ and $G^4$ to slide downward to perforate the paper over the dies $G'$ and $G^2$. The cam $G^{13}$ is circular, with two notches, causing the punch to operate on the paper twice in the same place, thus insuring its perforation. When the paper has been perforated, the cam $G^{13}$ again causes the arm $G^{12}$ to rise, so that the lever $G^9$ swings upward, thus lifting the punches $G^3$ and $G^4$ back to their normal position. (Shown in Fig. 8.) By reference to Figs. 1 and 9 it will be noticed that the punches $G^3$ and $G^4$ are disposed in a line extending obliquely on the paper A, so that the apertures $A^3$ and $A^4$, formed in the paper by the said punches, are arranged in an oblique line across the paper, as will be readily understood by reference to Fig. 10. The object of thus perforating the strip or web is to provide apertures in the body of the paper into which the two opposite pairs of shears may cut simultaneously to sever a double blank from the strip or web. Without such apertures the points of one pair of shears would interfere with those of the pair opposite, or there would be uncut portions of the paper to be torn apart by the turning disks, with danger of affecting the position of the blanks and causing badly-wound tubes.

The intermittent-feeding device H is provided with two grooved feed-rollers $H'$ and $H^2$, (see Figs. 1 and 2,) journaled in suitable brackets attached to the top of the bed-plate B. The shafts of the feed-rollers are connected with each other by suitable gearing $H^3$, so that two feed-rollers revolve in unison. The shaft of one of the feed-rollers $H'$ and $H^2$ carries at its rear end a gear-wheel $H^4$ in mesh with a gear-wheel $H^5$, mounted to turn on a stud $H^6$, supported in a suitable bracket attached to the bed-plate $B^2$. On the face of the gear-wheel $H^5$ is secured a bevel-pinion $H^7$ in mesh with a segmental gear-wheel $H^8$, secured on the shaft $O^8$. Now when the latter is rotated the said segmental gear-wheel $H^8$ will impart an intermittent rotary motion to the bevel gear-wheel $H^7$, so that the gear-wheels $H^5$ and $H^4$, together with the gearing $H^3$, impart an intermittent rotary motion to the feed-rollers $H'$ and $H^2$, so that the paper is intermittently fed forward by the said rollers. During the time the feed-rollers $H'$ and $H^2$ are rotating the printing and impression device, as well as the perforating device G, are out of action; but as soon as the feeding ceases impressions are made on the paper and the perforations $A^3$ and $A^4$ are formed in the paper in the manner above described.

Figures 13, 14, 15, 16:
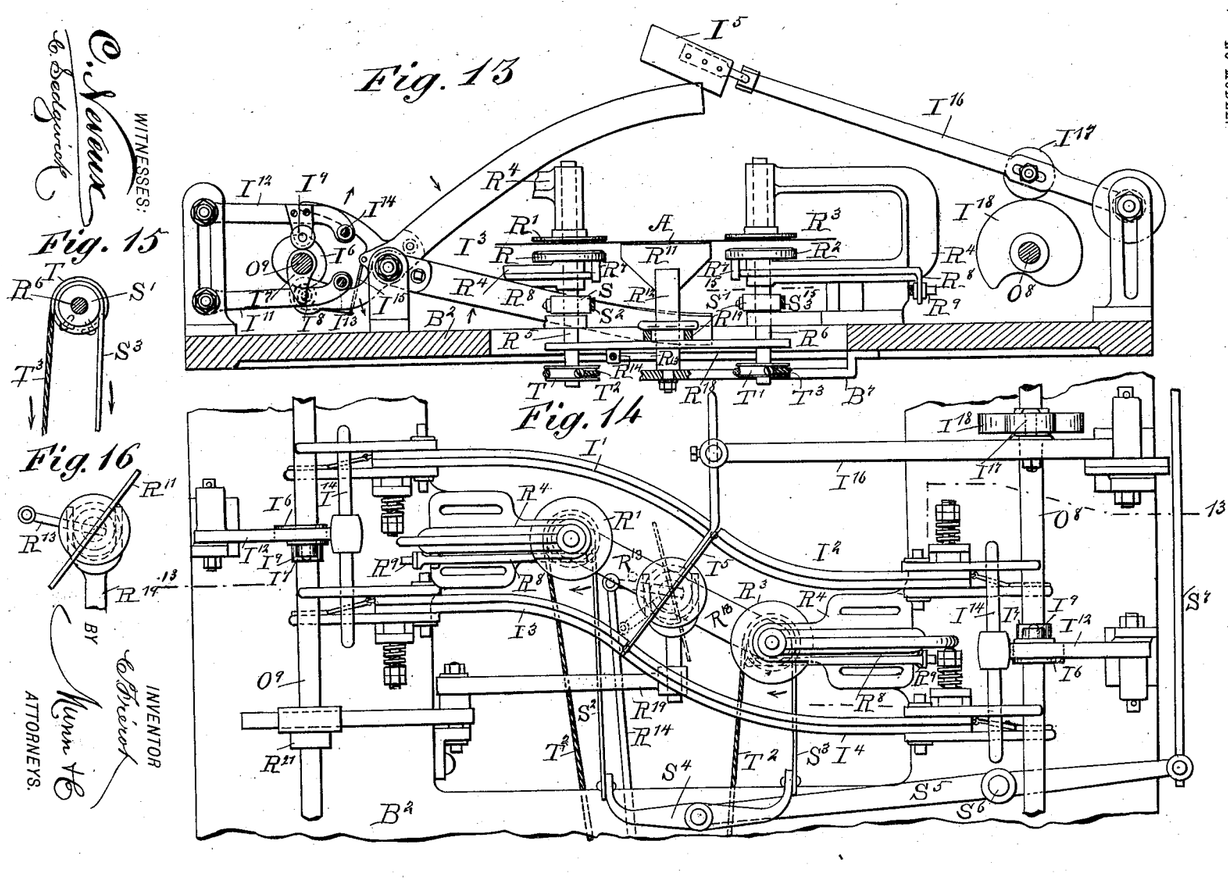
Fig. 13 is an enlarged transverse section of the paper-cutting device on the line 13 13 of Figs. 1 and 14.
Fig. 14 is a plan view of the same.
Fig. 15 is a sectional plan view of the disk-turning device for the paper-cutting mechanism, the section being taken on the line 15 15 of Fig. 13.
Fig. 16 is a plan view of the anvil for the oblique knife.

In order to properly guide the paper to the feed-rollers $H'$ and $H^2$, a bar $H^9$ is provided in front of the said rollers, the said bar being supported in the brackets forming the bearings for the said feed-rollers. The paper after leaving the feed-rollers passes to the cutting mechanism I, (shown in Figs. 1, 2, 13, and 14,) and is provided with four pairs of shears $I'$, $I^2$, $I^3$, and $I^4$ and a knife $I^5$ for cutting the paper into pieces of the proper shape (shown in Fig. 11) for forming the tube. As shown in Fig. 14, the two pairs of shears $I'$ and $I^2$ are shaped to form an S-curve across the paper, and in a like manner the pairs of shears $I^3$ and $I^4$ form an S-curve, the point of meeting between the pairs of shears $I'$ and $I^2$ being in the aperture $A^4$ of the paper, while the point of meeting of the other pair of shears $I^3$ and $I^4$ is at the aperture $A^3$. (See Fig. 10.) The forward pair of shears $I'$ and $I^2$ trims the front edge of the paper A to an S-curve $A^5$, thus removing a little waste between successive blanks, while the other two pairs of shears $I^3$ and $I^4$ cut off the paper in the proper S-curve $A^6$, as illustrated in full lines in Fig. 10. The knife $I^5$ is arranged obliquely and serves to cut the paper on the line $A^9$ between two adjacent apertures $A^4$ and $A^3$, so that the double blank cut off by the curved shears is cut into two pieces $A^7$ and $A^8$ both alike in shape, as shown in full lines in Fig. 10. The pairs of shears $I'$ and $I^3$ are actuated by cams $I^6$ and $I^7$ on the shaft $O^9$, and the other pairs of shears $I^2$ and $I^4$ are likewise actuated by such cams on the shaft $O^8$.

The forming of the blank, as indicated on the diagram Fig. 10, may be briefly summarized. The strip or web A is fed forward from right to left and perforated at $A^3$ and $A^4$. The curved dotted line $A^6$ at the front end of the strip shows where the preceding blank was cut off. The two curved full lines $A^5$ and $A^6$, extending across the front end of the strip, are the front and rear ends of a double blank to be cut off by the shears which from opposite edges cut into and terminate in the perforations $A^4$ and $A^3$, which said full lines intersect. This double blank is then severed by the knife $I^5$ on the oblique line $A^9$, forming two complete blanks $A^7$ and $A^8$ of the shape required for tapering tubes, as indicated by the fine dotted lines, showing the blanks in position after being turned about so as to bring said cut edges in line with the axis of the spindles and ready to move forward and enter the spindle-slot, as will be described.

As shown in Fig. 13, the cams $I^6$ and $I^7$ engage friction-rollers $I^8$ and $I^9$, respectively, held on levers $I^{11}$ and $I^{12}$, respectively, fulcrumed in a suitable bracket on the bed-plate $B^2$, near the outer side thereof. The levers $I^{11}$ and $I^{12}$ carry longitudinally-extending rods $I^{13}$ and $I^{14}$, respectively, of which the rod $I^{13}$ engages the outer ends of the upper shear-blades of the sets of shears $I'$ and $I^3$ or $I^2$ and $I^4$, respectively, while the other bar $I^{14}$ engages the outer ends of the lower blades of the sets of shears $I'$ and $I^3$ or $I^2$ and $I^4$. A spring $I^{15}$ is connected with the blades of each shear, so as to hold the same in contact at all times with the respective rods $I^{13}$ and $I^{14}$.

The oblique knife $I^5$ is secured on the free end of a lever $I^{16}$, extending transversely and fulcrumed on a suitable bracket attached to the bed-plate $B^2$. On this lever $I^{16}$ is held a friction-roller $I^{17}$, traveling on the peripheral surface of a cam $I^{18}$, secured on the shaft $O^8$, the said cam being shaped in such a manner that on every revolution of the shaft $O^8$ the said lever $I^{16}$ swings to move the knife $I^5$ in contact with the paper to cut the same obliquely between successive apertures $A^4$ and $A^3$, as plainly indicated in Fig. 10.

The paper is held stationary during the cutting operation, and after the pieces $A^7$ and $A^8$ are cut they are turned so as to be in proper position for feeding them to the winding-spindles K. The device for holding and turning the paper is shown in detail in Figs. 13 and 14 and is provided with sets of disks $R$ $R'$ and $R^2$ $R^3$, of which the disks $R'$ and $R^3$ are mounted to turn in suitable brackets $R^4$ and are located directly above the other disks R and $R^2$, mounted to turn and adapted to be raised and lowered with their shafts $R^5$ and $R^6$, respectively, in suitable bearings in the said brackets $R^4$. The paper passes between the disks R $R'$ and $R^2$ $R^3$, and the shafts $R^5$ $R^6$ are then moved upward, so as to clamp the paper between the several disks to hold the paper stationary during the cutting operation.

In order to limit the turning motion of the disks R and $R^2$, I provide them with downwardly-extending stop-pins $R^7$, each adapted to abut against the transversely-extending rod $R^8$, held adjustably on a screw $R^9$, screwing in the bracket $R^4$. In order to turn each of the shafts $R^5$ and $R^6$ in one direction, I secure on the said shafts the pulleys S and $S'$, connected with the ends of bands $S^2$ and $S^3$, extending longitudinally and connected with the ends of an arm $S^4$, held on the free end of a lever $S^5$, pivoted at $S^6$ to the bed-plate $B^2$ at the rear side thereof. (See Figs. 1 and 14.) The rear end of this lever $S^5$ is pivotally connected with a rod $S^7$, extending rearwardly and pivotally connected with a lever $S^8$, carrying a friction-roller $S^9$, traveling on the peripheral surface of the cam $S^{11}$, secured on the main driving-shaft O, next to the fast and loose pulleys $O'$, as will be readily understood by reference to Fig. 1. When the shaft O revolves, the cam $S^{11}$ imparts a swinging motion to the lever $S^8$, so that a reciprocating motion is given to the rod $S^7$, whereby a swinging motion is imparted to the lever $S^5$, so that a pull is exerted on the two bands $S^2$ and $S^3$, which causes the pulleys S and $S'$ to rotate, thus imparting a like rotary motion to the shafts $R^5$ and $R^6$, carrying the disks R and R'. In order to impart a rotary motion to the said shafts $R^5$ and $R^6$ in an opposite direction to that given to the shafts by the mechanism above described, I secure on the lower ends of the said shafts $R^5$ and $R^6$ grooved pulleys T and T', connected with the ends of a rope $T^2$, extending from the said pulleys at an opposite side to that given to the bands $S^2$ and $S^3$ from their pulleys S and S'. (See Figs. 13 and 14.) The rope $T^2$ passes around a pulley $T^4$, held on the free end of a transversely-extending lever $T^5$, pivoted on the rear side of the bed-plate $B^2$, as plainly shown in dotted lines in Fig. 1. The lever $T^5$ is connected by a link $T^6$ with the free end of a spring $T^7$, held on the bed-plate $B^2$. Now in Fig. 13 it will be seen that when the shafts $R^5$ and $R^6$ have been rotated in one direction by the action of the cam $S^{11}$, as above described, then a return movement of the said cams takes place in the opposite direction by the action of the spring $T^7$ on the lever $T^5$, connected with the rope $T^2$, passing over the pulleys T and T'. During the outward swinging movement of the inner end of the lever $S^5$ the spring $T^7$ is compressed, as then the rope $T^2$ is wound up on the pulleys T and T', so that the spring $T^7$ can rotate the shafts $R^5$ and $R^6$ in an opposite direction to turn the disks R and $R^2$ back to their former position—that is, until the stop-pins $R^7$ rest against the rods $R^8$.

The anvil $R^{11}$ underneath the paper A cooperates with the knife $I^5$ to cut the paper obliquely and is secured on the upper end of a shaft $R^{12}$, mounted to turn at its lower end in a bracket $B^7$, secured to the bed-plate $B^2$, as plainly shown in Fig. 13. On this shaft $R^{12}$ is secured a radially-extending arm $R^{13}$, connected by a link $R^{14}$ (see Figs. 1 and 14) with a lever $R^{15}$, fulcrumed on the rear side of the bed-plate $B^2$, the said lever being acted on by a cam $R^{16}$, secured on the shaft $O^8$, so that a rotary motion of the latter causes a swinging of the said lever $R^{15}$ to accept a push or pull on the link $R^{14}$ to turn the shaft $R^{12}$ forward and backward, so as to bring the anvil $R^{11}$ in alinement with the knife $I^5$ or out of alinement, as illustrated in dotted lines in Figs. 1 and 14. A spring $R^{17}$ presses on the lever $R^{15}$ to hold the same in contact with the cam $R^{16}$. To dispense with these axial movements of the anvil, if desired, it is only necessary to disconnect the arm $R^{13}$ or link $R^{14}$.

In order to impart an up-and-down sliding motion to the shafts $R^5$ and $R^6$, Figs. 13 and 14, to move the disks R and $R^2$ upward to clamp the paper between the disks R' and $R^3$, I provide an arm $R^{18}$, which engages both shafts $R^5$ and $R^6$ and is loosely fitted to slide on the shaft $R^{12}$. A forked end of a lever $R^{19}$ engages an annular recess on the hub of the said arm $R^{11}$, so that when the said lever $R^{19}$ is forced to swing or rock an up-and-down movement will be given to the arm $R^{18}$ to raise and lower the shafts $R^5$ and $R^6$ for the purpose above described. The lever $R^{19}$ is actuated by a cam $R^{21}$, Fig. 1, secured on the shaft $O^9$, so that the rotary motion of the latter causes the said cam $R^{21}$ to impart a swinging motion to the lever $R^{19}$ for the purpose above described.

It will be understood that when the machine is in operation the paper is clamped between the sets of disks R, R', $R^2$, and $R^3$, when the shears I', $I^2$, $I^3$, and $I^4$ cut the pieces of paper $A^7$ and $A^8$ from the end of the paper A, and at the same time the oblique knife $R^5$ makes the cut $A^9$ between the apertures $A^4$ and $A^3$. As soon as this has been accomplished and the shears have again opened and the knife $I^5$ swings upward to its normal position and the disks R $R^2$ are turned to move the cut pieces of paper $A^7$ and $A^8$ horizontally from the position shown in full lines to the position shown in dotted lines in Fig. 10, whereby the beveled edges A' of the said cut pieces of paper $A^7$ and $A^8$ are moved inwardly, while the former oblique cut edges $A^9$ move outwardly, as will be readily understood by reference to the said Figs. 1 and 10, the cut pieces of paper $A^7$ and $A^8$ are taken from the disks R and $R^2$ by the gripping and delivery device J after the disks have moved downward. (See Fig. 1 and details, Fig. 21.) Said gripping device consists of a movable jaw J', operating above a fixed jaw $J^2$, both U-shaped in form, as plainly shown in Fig. 1, one arm being adapted to grip the piece of paper $A^7$ and the other arm the piece of paper $A^8$, as will be readily understood by reference to the said Figs. 1 and 21. The fixed jaw $J^2$ is rigidly secured on an arm $J^3$, on which the other jaw J' is fulcrumed, and the said arm $J^3$ projects upwardly from a cross-head $J^4$, mounted to slide longitudinally in a suitable guideway $J^5$, extending longitudinally, as plainly shown in the drawings, the said guideway being supported from the rear end of the main frame B. The cross-head $J^4$ is pivotally connected by a pitman $J^6$ with the lower or free end of a lever $J^7$, fulcrumed at its upper end at $J^8$ on a bracket supported on top of the bed-plate $B^2$, as plainly illustrated in Figs. 1 and 21. On this lever $J^7$ is held a friction-roller $J^9$, engaging a cam $J^{11}$, secured on the main driving-shaft O, so that when the latter is rotated in the direction of the arrow b', Fig. 21, the said cam $J^{11}$ causes a forward and backward swinging of the lever $J^7$, so that a reciprocating motion is given to the cross-head $J^4$, connected with the said lever $J^7$ by the pitman $J^6$. The forward and backward movement of the cross-head $J^4$ causes a like movement of the fixed and pivoted jaws $J^2$ and J', so as to move the said jaws forward to engage the paper on the disks, and then after the jaws are closed and have gripped the paper to move rearward to deliver the paper to the winding-spindles K.

Figures 19, 21:
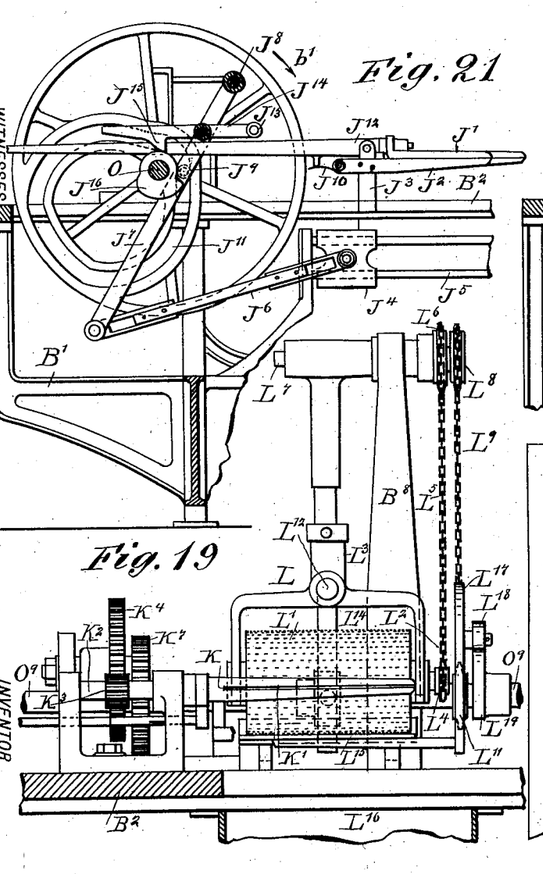
Fig. 19 is a rear sectional side elevation of the same on the line 19 19 of Figs. 1 and 17.
Fig. 21 is a sectional side elevation of the paper gripping and delivery devices for delivering the cut paper to the winding-spindles, the section being taken on the line 21 21 of Fig. 1.

The movable jaw J' is provided, as in Fig. 21, with a rearwardly-extending arm $J^{12}$, pressed on at its under side by a spring $J^{10}$, projecting from the arm $J^3$. On the top of the said rearward extension-arm $J^{12}$ rests a friction-roller $J^{13}$, held on one end of a lever $J^{14}$, secured on a suitable bracket projecting from the bed-plate $B^2$. (See Fig. 1.) On this lever $J^{14}$ is formed a downwardly-extending lug $J^{15}$, held in peripheral contact with a cam $J^{16}$, secured on the main shaft O, so that when the latter is rotated the said cam $J^{16}$ is pressed on the lug $J^{15}$ to impart a swinging motion to the lever $J^{14}$ at the time the jaws $J'$ and $J^2$ move close to the cut paper pieces $A^7$ and $A^8$ on the forward stroke of the cross-head $J^4$. The movement of the lever $J^{14}$ causes the friction-roller $J^{13}$ to press on the arm $J^{12}$, so that the jaw $J'$ opens to permit the paper pieces $A^7$ and $A^8$ to pass between the jaws, and at the time the cross-head $J^4$ commences its return stroke the cam $J^{16}$ has left the lug $J^{15}$, so that the arm $J^{12}$ is pressed on at its under side by the spring $J^{10}$ to close the jaw $J'$ down upon the paper so as to grip the same. On the return stroke of the cross-head $J^4$ the paper is carried rearwardly by the said gripping device, the paper being held between the ends of the U-shaped sets of jaws, as above described. The blanks are carried forward by the jaws $J'$ and $J^2$, the cut edge of each piece entering endwise through a slot in the spindle and the edge of piece $A^7$ also traversing a like slot made in the stand and bearings holding the spindle to the desired position in the spindle, these slots being in a continuous line. The slot in the stand is somewhat wider than that through the spindle and bearing, so that when the spindle is stopped the play of the gear upon it will not interfere with the free passage of the blank through it.

Figure 1:
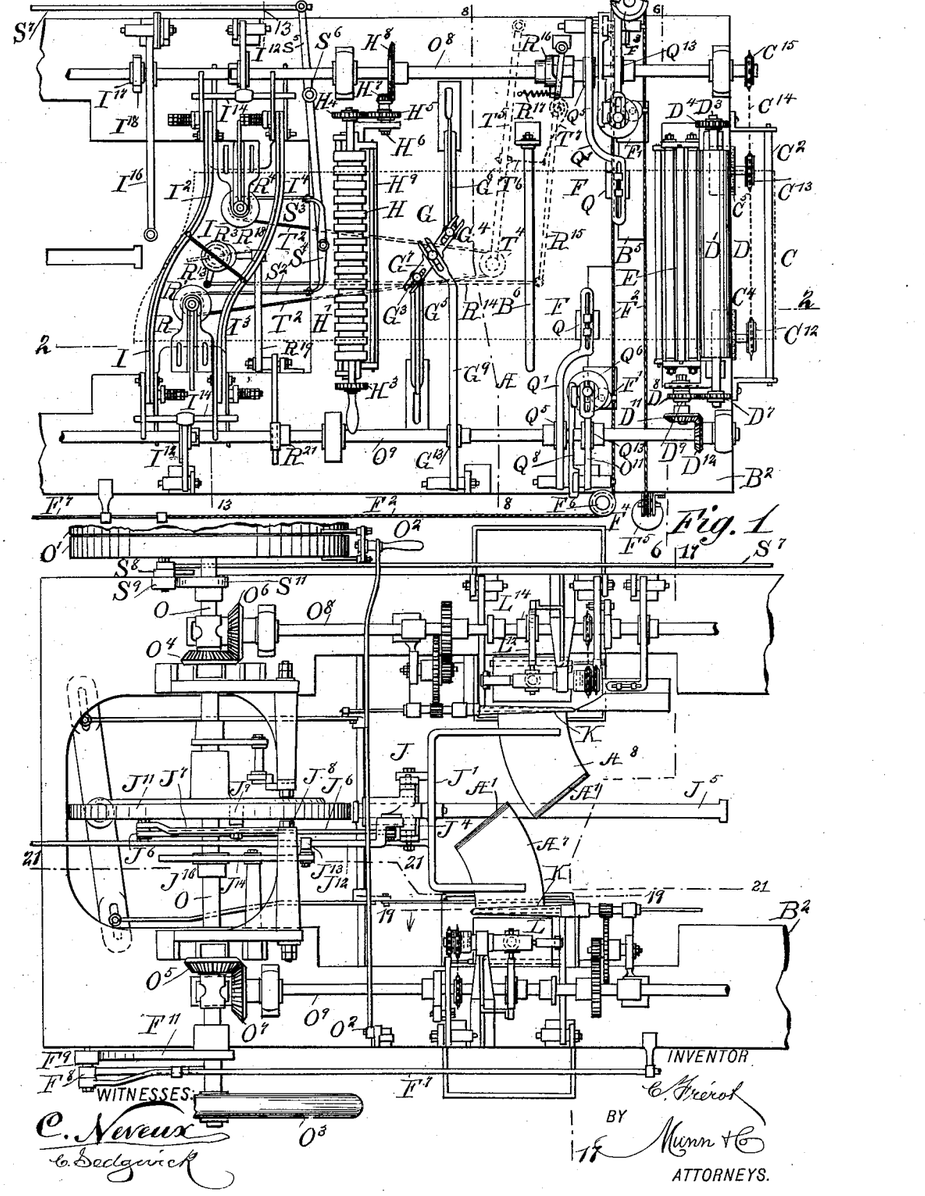
Figure 1 is a plan view of the machine, shown in two sections broken apart and displaced, the lower section belonging on the left of the upper one.
Figures 17, 18, 20:
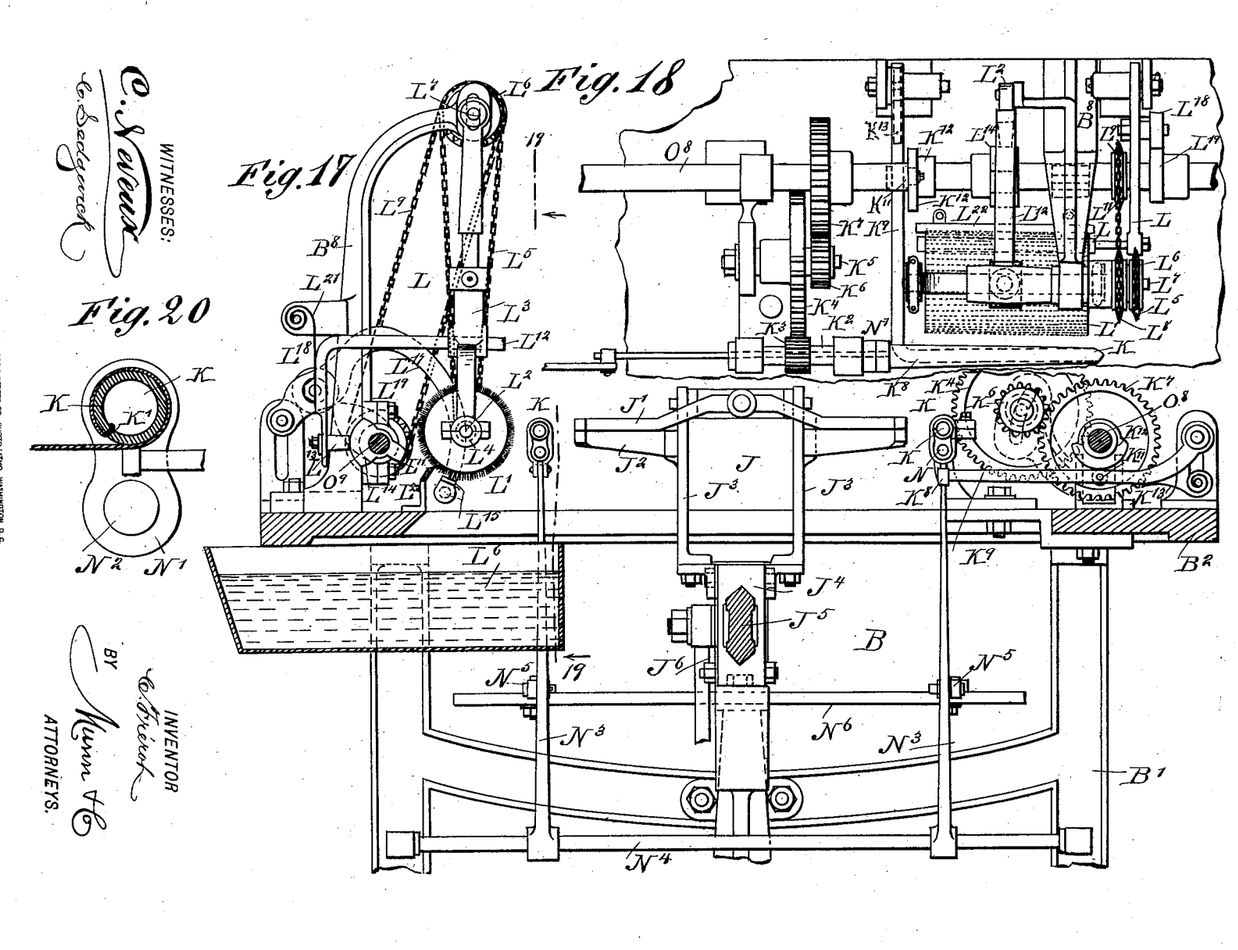
Fig. 17 is an enlarged transverse section of the glue or paste supplying device and the tube forming spindle on the line 17 17 of Fig. 1.
Fig. 18 is a plan view of the same.
Fig. 20 is an enlarged transverse section of the tube-forming spindle.

The paper-winding mechanisms are both alike in construction, so it suffices to describe one. Each spindle K is made hollow and, as shown in Fig. 20, is provided with a longitudinal slot $K'$, through which the edge of the piece of paper $A^7$ or $A^8$ can pass, as shown in Figs. 1 and 19. Each spindle K is provided with a shaft $K^2$, Fig. 18, mounted to turn in suitable bearings erected on the bed-plate $B^2$, and on this shaft $K^2$ is secured a pinion $K^3$, in mesh with an intermittent gear-wheel $K^4$, mounted to rotate on a stud $K^5$, supported on a suitable bracket held on a bed-plate $B^2$. On the face of the gear-wheel $K^4$ is secured a pinion $K^6$, in mesh with a gear-wheel $K^7$, held on the shaft $O^8$ or $O^9$, so that when the latter is rotated a fast rotary motion is given to the winding-spindle K, whereby the paper piece, suitably supplied with paste or the like, is wound upon the spindle, so that a tube is formed, the surface of the piece of paper being supplied with glue, paste, or other adhesive substance to cause the successive folds to adhere. The rotation of the winding-spindle is intermittent, a period of rest being allowed for the endwise insertion into the slot of the spindle of the edge of the piece of paper of which the tube is to be formed. The paper piece is brought forward by the jaws $J'$ and $J^2$, which seize it and carry it into place beside the spindle, with its edge in the slot thereof. The brief rest from rotation of the spindle is due to the absence of a few teeth from gear $K^4$, as in Figs. 17 and 18.

The paste-supplying device L is provided with a revoluble brush $L'$, (see Figs. 17, 18, and 19,) held on a shaft $L^2$, mounted to turn in suitable bearings in an arm $L^3$, adapted to swing from its upper end, which is supported on a bracket $B^8$, Fig. 19, attached to the top of the bed-plate $B^2$. A sprocket-wheel $L^4$ is secured on the shaft $L^2$ and is connected by a sprocket-chain $L^5$ with a larger sprocket-wheel $L^6$, held on the shaft $L^7$, journaled in the bracket $B^8$, forming the fulcrum for the arm $L^3$, Figs. 17 and 19. A second sprocket-wheel $L^8$ is secured on the said shaft $L^7$ and is connected by a sprocket-chain $L^9$ with a sprocket-wheel $L^{11}$, attached to the respective shaft $O^8$ or $O^9$, as will be readily understood by reference to Figs. 1, 17, and 18. Now when the said shafts $O^8$ and $O^9$ are rotated a rotary motion is transmitted by the said sprocket wheels and chains to the shaft $L^2$, so as to revolve the brush $L'$. A swinging motion is given to each arm $L^3$ from the shaft $L^7$, and for this purpose each arm $L^3$ is provided with a transversely-extending L-shaped arm $L^{12}$, formed with a lug $L^{13}$, held in peripheral contact with a cam $L^{14}$, secured on the shaft $O^8$ or $O^9$. This cam $L^{14}$ is so arranged as to impart twice a swinging motion to the said arm $L^3$ for each revolution of the shafts $O^8 O^9$, so that the brush $L'$ is moved twice into contact with the paper tube—once for supplying the necessary glue or paste and the second time for wiping off the surplus adhesive substance from the tube before the latter is discharged from the winding-spindle. In order to supply the necessary adhesive substance to the brush, I provide a plate $L^{15}$, adapted to move in contact with the bristles of the brush and also arranged to swing downwardly into the glue, paste, or other adhesive substance contained in the tank $L^{16}$, attached to the under side of the bed-plate $B^2$. This plate $L^{15}$ is supported on an arm $L^{17}$, fulcrumed at its outer end on a suitable bracket attached to the bed-plate $B^2$, and this arm $L^{17}$ carries a friction-roller $L^{18}$ in contact with a cam $L^{19}$, secured on the respective shaft $O^8$ or $O^9$. The rotary motion of the latter causes the said cam $L^{19}$ to act on the friction-roller $L^{18}$ to cause the arm $L^{17}$ to swing up and down, so that the plate $L^{15}$ is first moved downward into the paste or glue to take up some of the latter and is then moved in contact with the bristles of the brush L to supply the latter with the necessary adhesive substance, after which the arm $L^3$ swings inward to cause the brush $L'$ to deliver the adhesive substance to the piece of paper $A^7$ or $A^8$ ready to be wound. When this has been done, the brush returns and the surplus material is scraped off from the bristles by a plate $L^{22}$, after which the brush again swings inward to brush the outer edge onto the previous layer of the paper tube, at the same time removing surplus adhesive substance from the tube, so that the latter is wiped clean. The brush then returns to its normal position, and the above-described operation is repeated on the next revolution of the respective shaft $A^8$ or $A^9$. A spring $L^{21}$ presses on the arm $L^{12}$, so as to hold the lug $L^{13}$ thereof in frictional contact at all times with the cam $L^{14}$. A fixed scraper $L^{22}$ serves to keep the bristles of the brush $L'$ clean, the said brush moving in contact with the said scraper when swinging into an outermost position. (See Fig. 17.)

In order to press the paper onto the winding-spindle, I provide a presser-foot $K^8$, extending longitudinally under the spindle K and projecting from a lever $K^9$, arranged transversely and fulcrumed at its outer end on a suitable bracket attached to the bed-plate $B^2$. (See Figs. 17 and 18.) A friction-roller $K^{11}$ is held on the lever $K^9$ and travels on the periphery of a cam $K^{12}$, secured to the shaft $O^8$ or $O^9$, so that when the shaft is rotated the said lever $K^9$ is pressed downward by the cam $K^{12}$ to disengage the presser-foot $K^8$ from the paper at the time the paper is fed to the spindle. A spring $K^{13}$, Fig. 17, presses on the underside of the lever $K^9$, so as to move the presser-foot $K^8$ against the paper to firmly press the several layers to form the desired tube.

Figure 22:
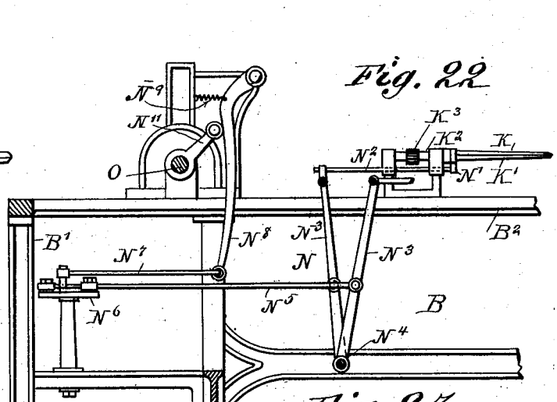
Fig. 22 is a like view of the device for removing the formed tubes from the spindle.
Figure 23:
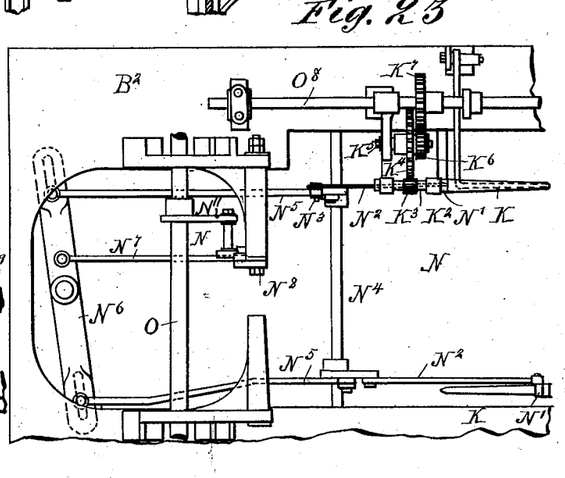
Fig. 23 is a plan view of the same.

In order to remove the finished paper tube from the spindle, I provide a removing device N, having an arm $N'$ engaging each spindle at the base end thereof during the time the paper is wound or fed to the spindle. This arm $N'$ (see Figs. 22 and 23) is secured on a longitudinally-extending rod $N^2$, pivotally connected with a lever $N^3$, secured on a shaft $N^4$, extending transversely and mounted to swing in suitable bearings in the main frame B. It is understood that the shaft $N^4$ carries the two levers $N^3$, actuating the pushing-arms $N'$ for the two spindles K. The levers $N^3$ are pivotally connected by links $N^5$ with the ends of the horizontally-mounted levers $N^6$, pivotally connected at one side of its fulcrum by a link $N^7$ with the lower end of an arm $N^8$, pivoted at its upper end on a suitable bracket erected on the bed-plate $B^2$. A spring $N^9$ presses on the said arm $N^8$, so as to hold the latter in the proper position, the arm receiving a swinging motion from the arm $N^{11}$, secured on the main driving-shaft O, as plainly shown in the Figs. 22 and 23, referred to. Now it will be seen that when the driving-shaft O revolves the arm $N''$ causes the arm $N^8$ to swing forward, so that the lever $N^6$ is shifted and by the links $N^5$ imparts a forward motion to the levers $N^3$, the latter turning in opposite directions, so that the rods $N^2$ are caused to slide longitudinally in opposite directions, and the pushing-plates $N'$ remove the finished tube from the spindle K. As previously explained, the two spindles K are arranged in opposite directions on opposite sides of the machine, so as to be in proper position to receive the angular-cut pieces of paper $A^7$ and $A^8$. (See Fig. 1.) As soon as the tube has been pushed off the spindle the spring $N^9$ pulls the arm $N^8$ back, so that the several parts connected with the said arm are returned to their normal position and the pushing-arms $N'$ are seated on the bases of the spindles K.

The operation is as follows: When the main driving-shaft O is rotated, the several devices are actuated in the manner above described, so that the paper is unwound from the roll $A^2$, is passed through the wetting device C, and receives at its edges sufficient moisture to soften the fiber of the paper, so that the printing and embossing mechanism can make proper impressions, and the adhesive material applied by the brush $L'$, as above described, will cause the folds of paper to adhere in the proper manner. The intermittent-feeding rollers $H'$ and $H^2$ feed the paper forward at such intervals that during the time the paper is at rest between the intermittent-feeding rollers $H'$ and $H^2$, and the compensating device E, the impressions are made, and the paper perforated at the same time, the cutting mechanism cuts off the pieces of the paper $A^7$ and $A^8$ in the manner above described. It is understood that when the shears close the sets of shears $I'$ and $I^2$ trim off the outer end of the paper A to form the curved edge $A^5$, (shown in full lines in Fig. 10,) and at the same time the other shears, $I^3$ and $I^4$, cut off a transverse strip of paper, and the knife $I^5$ subsequently makes the oblique cut $A^9$ to sever the transverse strip of paper, so as to form the two pieces $A^7$ and $A^8$. These pieces are then turned by the disks, as previously described, and then the gripping-jaws take hold of the paper, carry it to the slots $K'$ of the spindles K, which on revolving wind up the pieces of paper to form the tube, it being understood that the gripping-jaws have meanwhile opened to release the paper and that the adhesive substance is supplied by the brush $L'$ to the surface of each piece of paper after its edge is inserted in the slot of the spindle. The tubes are then wound by the rotating spindle, and the tube is wiped off by the brush in the manner above described. The tube-removing device then pushes off the tube from each spindle K, the said finished tubes dropping into suitable boxes arranged on the main frame B.

The machine illustrated is adapted to produce tapering tubes, and hence the paper is cut from the sheet A on curved lines, as shown in Fig. 10 and elsewhere. In making straight tubes, however, the sides of the strip cut off would be substantially straight and the shears would be shaped to correspond.

The thinning or beveling of the edges of the paper strip, as herein referred to, is for the purpose of giving better adhesion and making the tube more nearly cylindrical, with no defined shoulder and no tendency to curl at the joint. The beveling apparatus is not herein set forth.

Having thus fully described my invention, I claim as new and desire to secure by Letters Patent—

1. A machine for making paper tubes, comprising a set of continuous-feed rollers, a set of intermittent-feed rollers, a compensating device, a perforating device, a paper-cutting device, and disks for turning the cut-off papers, in combination with a spindle for winding up the piece of paper to form the tube, substantially as shown and described.

2. A machine for making paper tubes, comprising a wetting device, a set of continuous-feed rollers, a set of intermittent-feed rollers, a compensating device, a perforating device, a paper-cutting device, and disks for turning the cut-off papers, in combination with spindles for winding up the pieces of paper to form the tubes, and revolving brushes for supplying adhesive substance to the surface of the paper to unite its folds into a tube, substantially as shown and described.

3. A machine for making paper tubes, comprising a wetting device, a set of continuous-feed rollers, a set of intermittent-feed rollers, a compensating device, a printing device, a perforating device, a paper-cutting device, and disks for turning the cut-off papers, in combination with spindles for winding up the pieces of paper to form the tubes, a rotating brush for supplying adhesive substance to the surface of the paper to form the walls of the tube, and a tube-removing device for pushing the tube off the spindle when finished, substantially as shown and described.

4. In a machine for making paper tubes, an edge-wetting apparatus adapted to wet both edges of a continuous strip or web of paper as it enters the machine, in combination with a perforating apparatus, with cutters adapted to sever a double blank from the paper strip and divide it into two complete blanks, and with revoluble disks for partially rotating each blank and presenting its cut edge in line with the axis of the winding-spindle, substantially as shown and described.

5. In a machine for making paper tubes, an edge-wetting apparatus adapted to moisten both edges of a continuous strip or web of paper before paste is applied, in combination with feed-rollers and cutting mechanism acting subsequently to the moistening apparatus, and with turning disks and grippers for presenting the blanks to the spindles so that when the tube is completed the wetted edge of the blank shall form its terminal layer, substantially as shown and described.

6. In a machine for making paper tubes, a reciprocating punch for perforating the paper web, in combination with a set of shears adapted to cut from the opposite edges of the web into the same perforation, for cutting off the piece of paper at the desired line, substantially as shown and described.

7. In a machine for making paper tubes, a perforating device for the continuous web and a clamping device adapted to seize the forward end of said web before it is cut off, in combination with a set of shears adapted to cut from the opposite edges of the web into the same perforation for cutting off the piece of paper on a proper line, a knife arranged transversely to sever the piece of paper cut off by the shears, and an adjustable anvil arranged under the paper to permit said knife to properly cut the paper, substantially as shown and described.

8. In a machine for making paper tubes, a perforating device for the continuous web and a clamping device adapted to seize the forward end of said web before it is cut off, in combination with a paper-cutting device comprising sets of curved shears for trimming the forward end of the paper in a curved line and for cutting off the piece of paper also on a curved line, the cutters of each set cutting from the opposite edges of the web into the same perforation, and a cutting device arranged obliquely to sever the piece of paper cut off by the shears so as to form two complete blanks, said cutters terminating in said perforations, substantially as shown and described.

9. In a machine for making paper tubes, an edge-wetting mechanism, adapted to moisten both edges of the advancing sheet, in combination with a cutting mechanism adapted to cut from said sheet a strip of paper having two wet edges and to afterward shape and sever such strip, and with a clamping and turning mechanism for turning said severed pieces partially around so as to bring their wetted edges inward, toward the center of the machine, substantially as shown and described.

10. In a machine for making paper tubes, an edge-wetting mechanism, a paper cutting and severing mechanism operating as described, and half-rotating disks adapted to hold and turn the paper pieces, in combination with jaws adapted to clamp said pieces, and means for moving the jaws forward and backward to carry the paper from the disk to the spindles, and with pasting apparatus, acting after the blank reaches the spindle, substantially as shown and described.

11. In a machine for making paper tubes, an adhesive-substance-supplying device, comprising a cylindrical brush, a frame mounted to swing and in which the said brush is journaled, and means, substantially as described, for imparting a swinging motion to said frame, whereby said brush first applies paste to the paper piece upon the spindle, then withdraws, and again advances to brush off the surplus paste from the exterior of the tube, in combination with means for rotating the said brush, substantially as shown and described.

12. In a machine for making paper tubes, an adhesive-substance-supplying device, comprising a revoluble brush, a frame mounted to swing and in which the said brush is journaled, means, substantially as described, for imparting a swinging motion to the said frame, and means for rotating the said brush, in combination with an arm mounted to swing to and from the liquid-receptacle and provided with a plate adapted to dip into the adhesive substance and carry the same to the bristles of the said brush, substantially as shown and described.

13. In a machine for making paper tubes, a rotating slotted winding-spindle, and a presser-foot arranged under the said spindle and adapted to press the paper thereon, in combination with a rotary cylindrical brush adapted to deliver adhesive material to the paper while on the spindle, means to cause it to recede therefrom for partial cleansing, and means to cause it to again bear upon the tube to remove the surplus paste, substantially as shown and described.

14. In a machine for making paper tubes, rotatable clamping-disks mounted on coincident axes within their periphery and means for partially rotating said disks and the clamped piece of paper without a swinging movement of the clamps, substantially as shown and described.

15. In a machine for making paper tubes, two clamps provided with means to move vertically, one toward the other to seize the paper blank, and means to cause said clamps to partially rotate together on axes within their periphery and with the blank between them, without sidewise movement of the axis of said clamps, substantially as shown and described.

16. In a machine for making paper tubes, a clamp having two flat-faced members between which the paper blank is held, each member having a perpendicular shaft on which it makes a partial rotation, the center of such movement being within the outlines of the blank held by the clamp, in combination with means for actuating said clamps vertically and axially, substantially as shown and described.

17. In a machine for making paper tubes from a continuous web, clamping and turning disks provided with means to seize the paper before it is cut off and turn each blank after it is severed, so as to place the outermost margin of the turned blank in line with the slot in the winding-spindle without sidewise movement of the clamps, in combination with winding-spindles located nearer the outer edges of the machine than are said clamps and with their longitudinal slots normally open toward the center of the machine, with reciprocating carrying-jaws provided with means to seize the paper blank after it has been turned as stated and deliver it, free from paste, to the spindle with its outermost edge in said slot, and with pasting apparatus located beside said spindle and provided with means to apply paste to the blank after it reaches the spindle only, substantially as shown and described.

18. In a machine for making paper tubes, carrying means adapted to move the shaped blank to the spindle and insert one of its edges into the slot of the spindle, in combination with pasting apparatus located beside the spindle and including a rotating brush and a reciprocating presser-foot and means to cause said brush to advance and deliver paste to the blank, then to recede therefrom while the presser-foot acts, and afterward to again advance, wipe off the surplus paste and finish the lap of the tube, substantially as shown and described.

CHARLES FREROT.

Witnesses:
F. SAMSON,
FRANÇOIS MERTENS.